United States Patent
Peppel

(10) Patent No.: US 6,386,595 B1
(45) Date of Patent: May 14, 2002

(54) SWIVEL JOINT AND METHOD FOR CONNECTING CONDUITS

(75) Inventor: George Walter Peppel, Corsicana, TX (US)

(73) Assignee: Wellstream, Inc., Panama, FL (US)

( * ) Notice: Subject to any disclaimer, the term of this patent is extended or adjusted under 35 U.S.C. 154(b) by 16 days.

(21) Appl. No.: 09/580,074

(22) Filed: May 30, 2000

(51) Int. Cl.[7] ............. F16L 17/00; F16L 27/00
(52) U.S. Cl. ............. 285/281; 285/98; 285/234; 285/278
(58) Field of Search ............. 285/10, 11, 98, 285/234, 278, 280, 281

(56) References Cited

U.S. PATENT DOCUMENTS

| | | | | |
|---|---|---|---|---|
| 2,532,669 A | * | 12/1950 | Jones | 285/278 X |
| 2,770,475 A | * | 11/1956 | Rafferty | 285/281 X |
| 2,833,568 A | * | 5/1958 | Corsette | 285/281 |
| 3,290,065 A | * | 12/1966 | Porath | 285/278 X |
| 3,411,811 A | * | 11/1968 | Holland | 285/281 X |
| 3,997,198 A | | 12/1976 | Linder | |
| 4,236,737 A | | 12/1980 | Herbert et al. | |
| 4,438,957 A | | 3/1984 | Williams et al. | |
| 4,468,056 A | | 8/1984 | Kramer et al. | |
| 4,620,728 A | | 11/1986 | Barth et al. | |
| 4,750,761 A | | 6/1988 | Watts | |
| 5,458,375 A | | 10/1995 | Anspach, Jr. et al. | |

FOREIGN PATENT DOCUMENTS

| | | | | |
|---|---|---|---|---|
| GB | 1435498 | * | 5/1976 | 285/281 |

* cited by examiner

Primary Examiner—Neill Wilson
(74) Attorney, Agent, or Firm—Haynes and Boone, LLP

(57) ABSTRACT

A swivel joint for coupling a first conduit to a second conduit includes a swivel bearing comprising a body of fluid. The swivel bearing eliminates the creation and transmission of torsional and shear loads when one or both of the conduits are axially loaded.

26 Claims, 2 Drawing Sheets

SWIVEL JOINT AND METHOD FOR CONNECTING CONDUITS

BACKGROUND

This invention relates generally to swivel joints, and in particular to swivel bearings for use in swivel joints.

Swivel joints are commonly utilized in conduit systems in which conduits connected in end-to-end relationship require relative conduit movement, either in an angular or rotative manner, and where the integrity of the conduit system is to be preserved during such deformation. Conventional swivel joints have incorporated ball and socket arrangements, elastomeric seals, rotative seals and other mechanical devices which permit the interconnected conduits limited relative movement. Conventional swivel joints are commonly used in locations hundreds of feet below the surface of a body of water and the exteriors of the swivel joints are subjected to very high fluid pressure. Furthermore, the interiors of the swivel joints may also be subjected to very high fluid pressures.

Conventional swivel joints presently available for use under such adverse conditions have not proven as dependable and rugged as desired.

The present invention is directed to overcoming one or more of the limitations of existing swivel joints.

SUMMARY

According to one embodiment of the present invention, a swivel joint is provided that includes a body coupled to a first conduit, a sleeve coupled to a second conduit adapted to be received by the body, a retaining member coupled to the body, including a counterbore adapted to receive the sleeve, a chamber defined by the sleeve and retaining member, and a body of fluid contained within the chamber.

According to another embodiment of the present invention, a method of coupling a first rigid conduit to a second rigid conduit is provided that includes transmitting axial loads between the first and second conduits using a body of fluid.

The present embodiments of the invention provide a swivel joint that eliminates the creation and transmission of torsional and shear loads when one or more of the conduits are axially loaded. As a result, the operational life of the swivel joint, as well as the conduits coupled by the swivel joint, is greatly enhanced.

DESCRIPTION OF THE PREFERRED EMBODIMENTS

Figure 1:
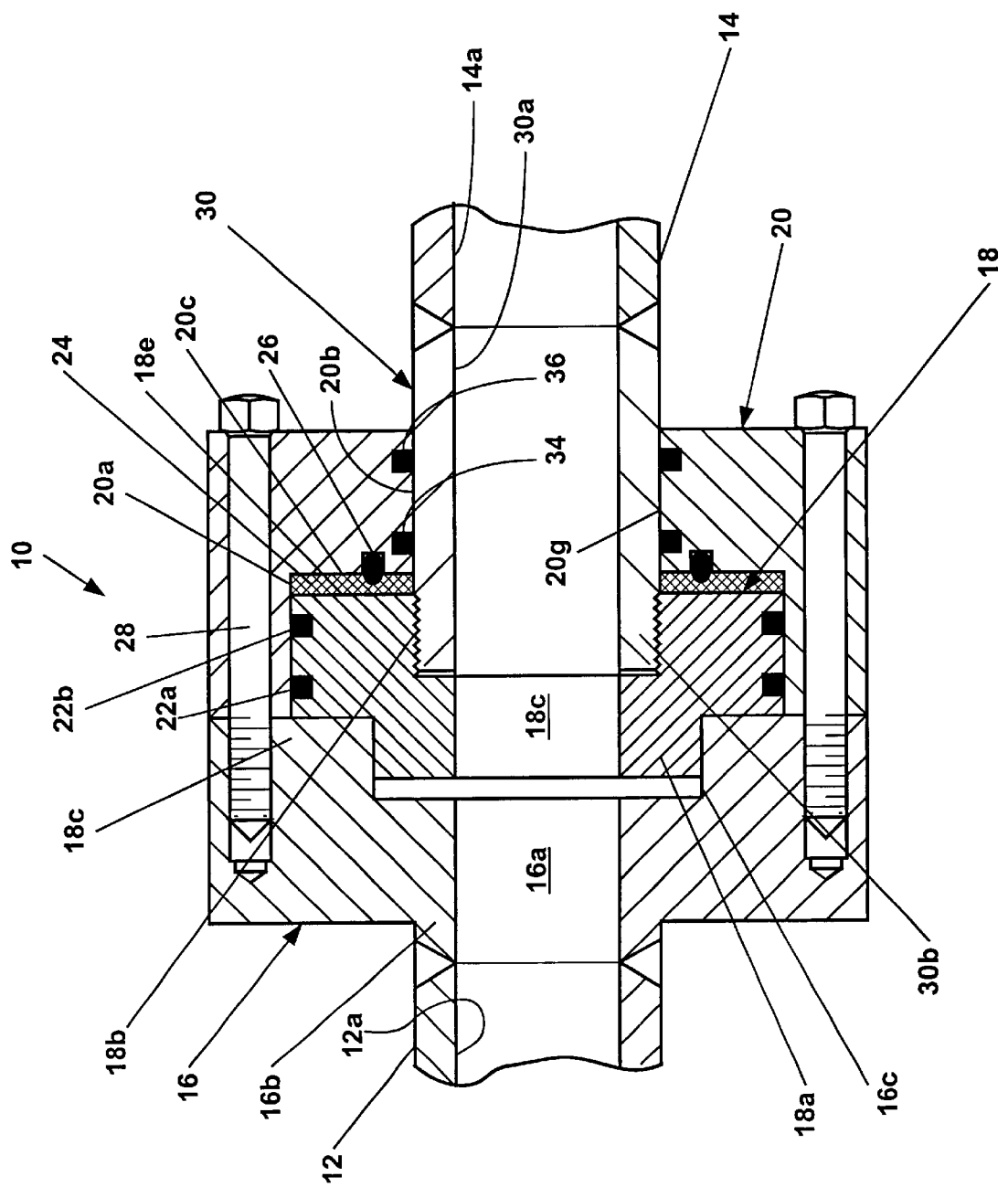
FIG. 1 is a cross-sectional view illustrating a first embodiment of a swivel joint.

Referring to FIG. 1 of the drawings, the reference numeral 10 refers, in general, to a swivel joint according to an embodiment of the invention for coupling a conduit 12 to a conduit 14. The swivel joint 10 includes a body member 16 defining a central through bore 16a and having an annular flange 16b formed at one end thereof and surrounding the bore for connecting to the corresponding end of the conduit 12 in any known manner, such as by welding. An enlarged counterbore 16c is formed in the other end of the body member 16 for reasons to be described.

A sleeve 18 has an annular flange 18a extending from one end thereof which extends in the counterbore 16c of the body member 16 in a sliding fit. A threaded counterbore 18b is formed in the other end of the sleeve 18, and a central bore 18c extends through the length of the sleeve 18.

A retaining member 20 is provided for connecting the sleeve 18 to the body member 16 and includes a counterbore 20a for receiving the sleeve 18 and a central bore 20b. A pair of seal rings 22a and 22b are provided in two axially-spaced annular grooves, respectively, that are formed in the outer surface of the sleeve 18. The seal rings 22a and 22b engage the corresponding inner wall of the retaining member 20 to seal the interface between the sleeve and the retaining member. An annular chamber 24 is defined between the bottom of the counterbore 20a of the retaining member 20 and the corresponding end of the sleeve 18. A seal ring 26 extends in an annular groove formed in the bottom face of the counterbore 20a for reasons to be described. A lubricating fluid is disposed in the chamber 24. A plurality of angularly spaced bolts 28, two of which are shown in FIG. 1, extend through corresponding openings formed through the retaining member 20 and into corresponding internally threaded openings formed in the body member 16 to fasten the retaining member to the body member with the sleeve 16 captured there between.

A portion of a tubular member 30 extends in the bore 20b of the retaining member 20 and has a central through bore 30a. The tubular member 30 has an externally threaded end portion 30b that extends in the internally threaded counterbore 18c of the sleeve 18 in a threaded engagement. The other end of the tubular member 30 is connected to the corresponding end of the conduit 14 in a conventional manner, such as by welding. A pair of seal rings 34a and 34b extend in axially-spaced annular grooves formed in the inner surface of the retaining member 20 and engage the outer wall of the tubular member 30 to seal the interface between the retaining member and the tubular member.

The bores 16a, 18c and 30a of the body member 16, the sleeve 18, and the tubular member 30 respectively, define a continuous bore that extends between, and in an aligned, coaxial relationship with the bores 12a and 14a of the conduits 12 and 14. Thus, fluid can pass between the conduits 12 and 14 and through the swivel joint 10.

During operation of the swivel joint 10, axial loads applied to the second conduit 14 are transmitted to the lubricating fluid provided in the chamber 24 thus eliminating any significant torsional loads on the swivel joint 10. Therefore, the operational life of the swivel joint 10 is significantly increased. In the event of leakage of any lubricating fluid from the chamber 24, the O-ring seal 26 prevents metal to metal contact between the end walls 18e and 20c and any seizure of the swivel joint 10.

Figure 2:
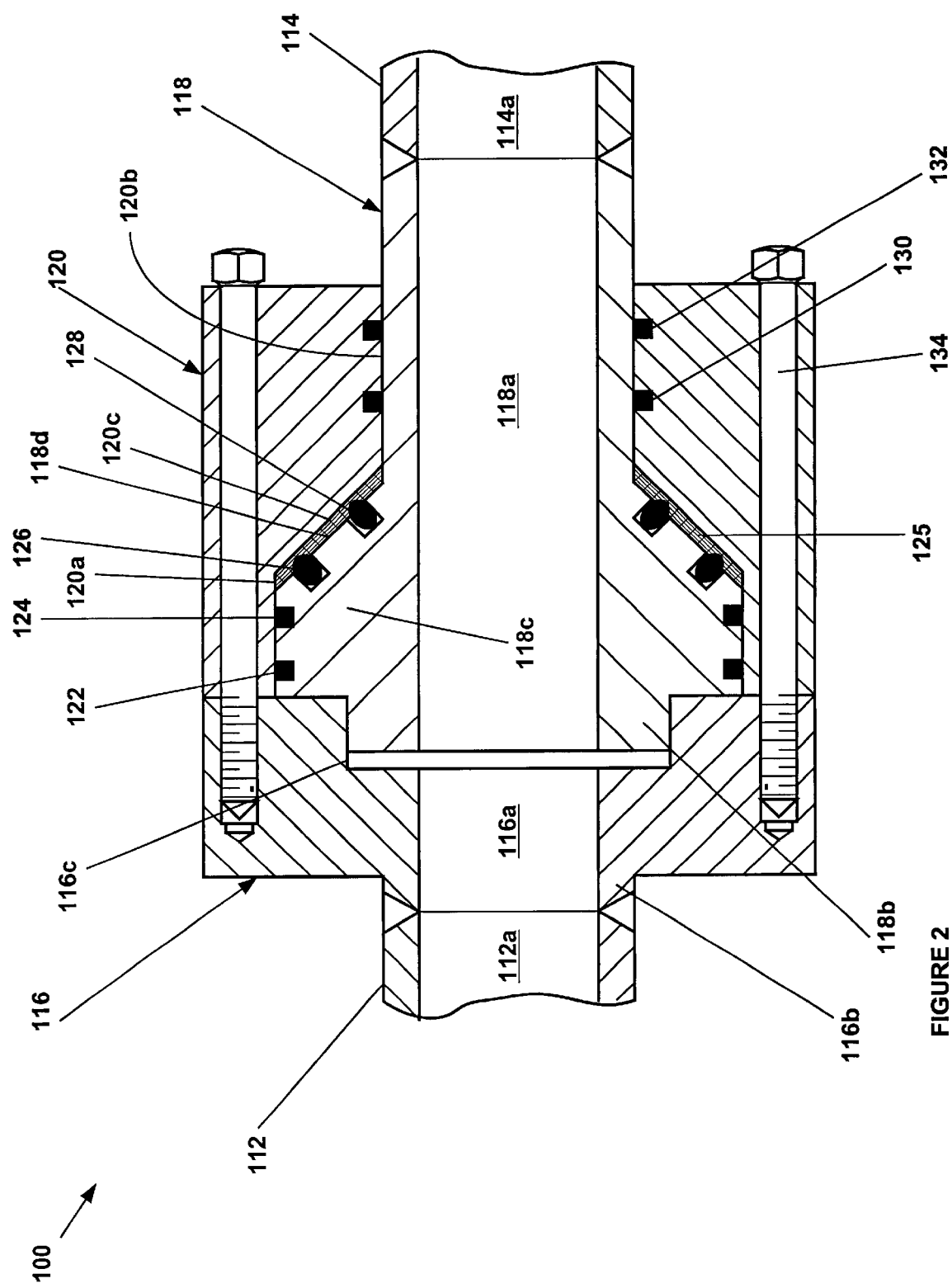
FIG. 2 is a cross-sectional view illustrating a second embodiment of a swivel joint.

Referring to FIG. 2 of the drawings, the reference numeral 100 refers, in general, to a swivel joint according to an alternate embodiment of the invention for coupling a conduit 112 to a conduit 114. The swivel joint 100 includes a body member 116 defining a central through bore 116a and having an annular flange 116b formed at one end thereof and surrounding the bore for connecting to the corresponding end of the conduit 112 in any known manner, such as by welding. An enlarged counterbore 116c is formed in the other end of the body member 116 for reasons to be described.

A tubular member 118 defining a central through bore 118a has an annular flange 118b extending from one end thereof which extends in the counterbore 116c of the body member 16 in a sliding fit. The tubular member 118 further includes an annular flange 118c extending from an intermediate portion thereof. The other end of the tubular member 118 is connected to the corresponding end of the conduit 14 in a conventional manner, such as by welding.

A retaining member 120 is provided for connecting the tubular member 118 to the body member 116 and includes a counterbore 120a for receiving the annular flange 118c of the tubular member 118 and a bore 120b for receiving an end of the tubular member 118. A pair of seal rings 122 and 124 are provided in two axially-spaced annular grooves, respectively, that are formed in the outer surface of the annular flange 118c of the tubular member 118. The seal rings 122 and 124 engage the corresponding inner wall of the retaining member 120 to seal the interface between the sleeve and the tubular member. A radially inclined annular chamber 125 is defined between the inclined bottom of the counterbore 120a of the retaining member 120 and the corresponding inclined end of the annular flange 118c of the tubular member 118. A pair of seal rings 126 and 128 extend in two spaced annular grooves formed in the inclined end of the annular flange 118c for reasons to be described. A lubricating fluid is disposed in the chamber 125.

A pair of seal rings 130 and 132 are provided in two axially-spaced annular grooves, respectively, that are formed in the inner surface of the bore 120b of the retaining member 120. The seal rings 130 and 132 engage the corresponding outer surface of the end of the tubular member 118 to seal the interface between the retaining member 120 and the tubular member 118.

A plurality of angularly spaced bolts 134, two of which are shown in FIG. 2, extend through corresponding openings formed through the retaining member 120 and into corresponding internally threaded openings formed in the body member 116 to fasten the tubular member 118 to the retaining member 120.

The bores 116a and 118a of the body member 116 and the tubular member 118 respectively, define a continuous bore that extends between, and in an aligned, coaxial relationship with the bores 112a and 114a of the conduits 112 and 114. Thus, fluid can pass between the conduits 112 and 114 and through the swivel joint 100.

During operation of the swivel joint 100, axial loads applied to the second conduit 114 are transmitted to the lubricating fluid provided in the chamber 129 thus eliminating any significant shear or torsional loads on the swivel joint 100. Therefore, the operational life of the swivel joint 10 is significantly increased. In the event of leakage of any lubricating fluid from the chamber 129, the O-ring seals 126 and 128 prevent metal to metal contact between the end walls 18e and 20c and any seizure of the swivel joint 10.

The swivel joints of the present disclosure provide several advantages. For example, the inclusion of a swivel bearing in the form of an annular body of lubricating fluid eliminates the generation of any torsional or shear loads. Furthermore, the addition of resilient members within the chambers housing the lubricating fluid of the swivel bearing prevents seizure of the swivel joints in the event of leakage of the lubricating fluid from the fluid chambers. Therefore, the swivel joints of the present disclosure maximize the useful operational life of conduits while also minimizing the generation of harmful torsional and shear loading conditions on the conduits.

It is understood that variations may be made in the foregoing without departing from the scope of the invention. For example, the chambers 24 and 129 may include a plurality of chambers that are axially and/or radially and/or angularly spaced apart in order to receive the lubricating fluid and provide additional axial load bearing capacity. Furthermore, the chambers 24 and 129 may be inclined at any angle relative to the axial direction in order to optimally accommodate axial and/or normal forces. In addition, the lubricating fluid provided in the chambers 24 and 129 may at least partially include gaseous and/or solid materials in order to minimize frictional forces. Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A swivel joint for coupling a first conduit to a second conduit, comprising:
    a sleeve coupled to the second conduit;
    a tubular member interconnecting the sleeve and the second conduit;
    a body coupled to the first conduit adapted to receive a portion of the sleeve;
    a retaining member coupled to the body, including a counterbore adapted to receive another portion of the sleeve;
    a chamber defined by the sleeve and the retaining member; and
    a body of fluid contained within the chamber.

2. The swivel joint of claim 1, further comprising one or more sealing members for sealing an interface between the sleeve and the retaining member.

3. The swivel joint of claim 1, further comprising one or more sealing members for sealing an interface between the second conduit and the retaining member.

4. The swivel joint of claim 1, further comprising one or more sealing members positioned within the chamber.

5. A swivel joint for coupling a first conduit to a second conduit, comprising:
    a sleeve coupled to the second conduit;
    a body coupled to the first conduit adapted to receive a portion of the sleeve;
    a retaining member coupled to the body, including a counterbore adapted to receive another portion of the sleeve;
    a chamber defined by the sleeve and the retaining member;
    a body of fluid contained within the chamber; and
    the chamber being inclined relative to the axes of the conduits.

6. A swivel joint for coupling a first conduit to a second conduit, comprising:
    a first member connected to the first conduit;
    a retaining member connected to the first member and having a portion extending in a spaced relation to the first member;
    a sleeve connected to the second conduit and disposed in the space between the first member and the retaining member;
    a tubular member interconnecting the sleeve and the second conduit;
    a chamber extending between the sleeve and the retaining member; and a fluid disposed in the chamber for transmitting axial loads between the first and second conduits without inducing torsional loads.

7. The swivel joint of claim 6 wherein the respective bores of the first and second conduits are aligned and where the first member and the sleeve have bores in alignment with the bores of the conduits.

8. The swivel joint of claim 6 wherein the second conduit threadedly engages the sleeve and wherein the chamber extends around the second conduit.

9. The swivel joint of claim 6 wherein the second conduit extends through a central opening formed in the retainer member.

10. The swivel joint of claims further comprising a plurality of bolts extending through aligned openings in the first member and the retaining member to connect the retaining member to the first member.

11. The swivel joint of claim 6 further comprising at least one sealing member extending in the interface between the retaining member and the sleeve to seal against the egress of fluid from the chamber.

12. The swivel joint of claim 6 further comprising at least one sealing member extending in the interface between the retaining member and the second conduit to seal against the egress of fluid from the chamber.

13. The swivel joint of claim 6 further comprising at least one sealing member disposed in the chamber.

14. A swivel joint for coupling a first conduit to a second conduit, comprising:

a first member connected to the first conduit;

a retaining member connected to the first member and having a portion extending in a spaced relation to the first member;

a sleeve connected to the second conduit and disposed in the space between the first member and the retaining member;

a chamber extending between the sleeve and the retaining member;

a fluid disposed in the chamber for transmitting axial loads between the first and second conduits without inducing torsional loads; and the chamber being inclined with respect to the axes of the conduits.

15. A joint for connecting two conduits, the joint comprising a first member connected to one of the conduits, a second member connected to the other conduit, means for establishing a chamber for containing fluid between the conduits so that the fluid transmits axial loads between the members, and interconnecting a tubular member between the second member and the respective other conduit.

16. The joint of claim 15 further comprising a third member connected to the first member and defining the chamber with the second member.

17. The joint of claim; wherein the second conduit extends through a central opening formed in the third member.

18. The joint of claim 16 further comprising a plurality of bolts extending through aligned openings in the first member and the third member to connect the third member to the first member.

19. The joint of claim 15 wherein the respective bores of the first and second conduits are aligned and where the members have bores in alignment with the bores of the conduits.

20. The joint of claim 15 wherein the second conduit threadedly engages the second member and wherein the chamber extends around the second conduit.

21. The joint of claim 15, further comprising at least one sealing member extending in the interface between the second member and the third member to seal against the egress of fluid from the chamber.

22. The joint of claim 15, further comprising at least one sealing member extending in the interface between the third member and the second conduit to seal against the egress of fluid from the chamber.

23. The joint of claim 15, further comprising at least one sealing member disposed in the chamber.

24. A joint for connecting two conduits, the joint comprising a first member connected to one of the conduits, a second member connected to the other conduit, means for establishing a chamber for containing fluid between the conduits so that the fluid transmits axial loads between the members, and the chamber being inclined with respect to the axes of the conduits.

25. A method of connecting two conduits comprising connecting one of the conduits to a first member, connecting the other conduit to a second member, establishing a chamber containing fluid between the conduits so that the fluid transmits axial loads between the members, and inclining the chamber with respect to the axes of the conduits.

26. The method of claim 18 further comprising the step of connecting a third member to the first member and defining the chamber with the second member.

\* \* \* \* \*